United States Patent [19]
Wakatsuki

[11] Patent Number: 5,095,395
[45] Date of Patent: Mar. 10, 1992

[54] MAGNETIC DISK STORAGE DEVICE HAVING A RETURN MECHANISM FOR AUTOMATICALLY POSITIONING HEADS TO NON-DATA AREA

[75] Inventor: Hidehiro Wakatsuki, Kawasaki, Japan

[73] Assignee: Tokico Ltd., Kanagawa, Japan

[21] Appl. No.: 450,275

[22] Filed: Dec. 8, 1989

[30] Foreign Application Priority Data

Dec. 9, 1988 [JP] Japan .................. 63-311757

[51] Int. Cl.$^5$ ........................... G11B 5/54; G11B 5/56
[52] U.S. Cl. .................................. 360/105; 360/109
[58] Field of Search .................. 360/78.12, 105, 106, 360/109, 97.02

[56] References Cited

U.S. PATENT DOCUMENTS

| | | | |
|---|---|---|---|
| 4,139,874 | 2/1979 | Shiraishi | 360/105 X |
| 4,706,142 | 11/1987 | Hattori et al. | 360/105 |
| 4,764,831 | 8/1988 | Patel | 360/105 |

FOREIGN PATENT DOCUMENTS

8702497  4/1987  PCT Int'l Appl.
1259926  1/1972  United Kingdom.

*Primary Examiner*—Andrew L. Sniezek
*Attorney, Agent, or Firm*—Darby & Darby

[57] ABSTRACT

A magnetic disk storage device includes a magnetic disk having an annular data area for recording data, a drive for rotating the magnetic disk about the axis of the magnetic disk, a magnetic head for reading and writing data to and from the data area of the magnetic disk, and a transfer motor for moving the magnetic head when actuated. The magnetic disk further comprises an urging member and a locking member. The urging member forces the magnetic head, so as to move the magnetic head outside the data area. The locking member prevents the urging member from jarring the magnetic head when the transfer motor is actuated.

7 Claims, 2 Drawing Sheets

MAGNETIC DISK STORAGE DEVICE HAVING A RETURN MECHANISM FOR AUTOMATICALLY POSITIONING HEADS TO NON-DATA AREA

BACKGROUND OF THE INVENTION

1. Field of the Invention

The present invention generally relates to a magnetic disk storage device with floating type magnetic heads. The present invention also relates to a return mechanism used in such a magnetic disk storage device for automatically positioning heads to non-data area.

2. Prior Art

In a magnetic disk storage device with a floating type magnetic head, the floating heads are held slightly above the disk surface by air flow resulting from the rotation of the magnetic disk. In that position, data is written to and read from the magnetic disk.

In such a magnetic disk storage device, after the input or output step is finished, the rotation of the magnetic disk is stopped. Then, the deceleration heads lower and come into contact with the surface of the decelerating magnetic disk.

For this reason, directly after starting the magnetic disk and directly before the magnetic disk stops turning, the surface of the disk may receive wear or mechanical injury from the descending head as the air flow becomes too weak to maintain the magnetic head above the disk surface. Furthermore, because the head comes in to contact with the disk in a data area, loss of data may occur due to any injury that occurs to the disk surface.

In addition, when the magnetic disk storage device is moved or bumped, bouncing of the head on the disk surface may occur with resulting disk damage and possible data loss.

In order to solve these problems, a return mechanism for magnetic disk storage devices was proposed recently. The return mechanism automatically positions heads to non-data area which will hereinafter be abbreviated an "auto-return mechanism".

Such an auto-return mechanism comprises a spring which connects the housing of the storage device and the carrier mounted to the magnetic head. The spring acts on the magnetic head to move and maintain it outside of the data area when the electric power is off. However, in a magnetic disk storage device with the above described auto-return mechanism, several problems remain.

The longer the spring extends, the stronger the spring force becomes. That is, the spring force varies due to the position of the head. Additionally, if the head is moved at high speed, the spring causes the head to vibrate. Consequently, the spring force undesirably effects the position of the carrier during head positioning operations, so that the position of the head is difficult to control.

In addition, the starting position of the head on the magnetic disk, that is track No. 0, from where the head starts to read and/or write data is important to assure correct data transfer. However, the starting position of the head is easily affected by a dimension error in manufacturing the carrier and mounting the carrier to the magnetic disk storage device. Therefore, an adjusting mechanism for adjusting the starting position of the head has been required.

SUMMARY OF THE INVENTION

It is therefore an object of the present invention to provide a magnetic disk storage device in which data loss is prevented, and in which the carrier is smoothly moved, and the position of the head is accurately controlled.

It is another object of the present invention to provide a magnetic disk storage, in which the starting position of the head is adjusted correcting for dimensional errors due to the manufacturing and assembling of the carrier.

It is another object of the present invention to provide an auto-return mechanism used for the magnetic disk storage devices which can control the position of the carrier accurately.

In accordance with one aspect of the present invention, the magnetic disk storage device includes a drive means, a magnetic disk, a magnetic head, transfer means, and urging or parking means. The drive means rotates a magnetic disk about the axis thereof. The magnetic disk has a data area comprised of annular tracks for recording data and for reading data therefrom. The magnetic disk further has an annular non-data area. The magnetic head reads and writes data to and from the tracks on the magnetic disk. The magnetic head is disposed for movement along a travel path generally coincidental with a radius of the magnetic disk. The transfer means moves the magnetic head along the travel path when actuated. The urging or parking means forces the magnetic head in a direction along the travel path so as to move the magnetic head into a landing position in the non-data area.

The magnetic disk storage device further includes a locking means for preventing the urging means from jarring the magnetic head when the transfer means is actuated.

With such a structure, when the rotation of the magnetic disk is stopped, the urging means forces the magnetic head into the non-data area. Therefore, loss of the written data on the magnetic disk is prevented.

Furthermore, since the locking means prevents the urging means from jarring the magnetic head, the magnetic head is moved independently from the urging means. Hence, the transfer means smoothly moves the magnetic head and the position of the head is accurately controlled.

DETAILED DESCRIPTION OF THE PREFERRED EMBODIMENT

With reference to the accompanying drawings, a preferred embodiment of the present invention will be described in detail hereinafter.

Figure 1:
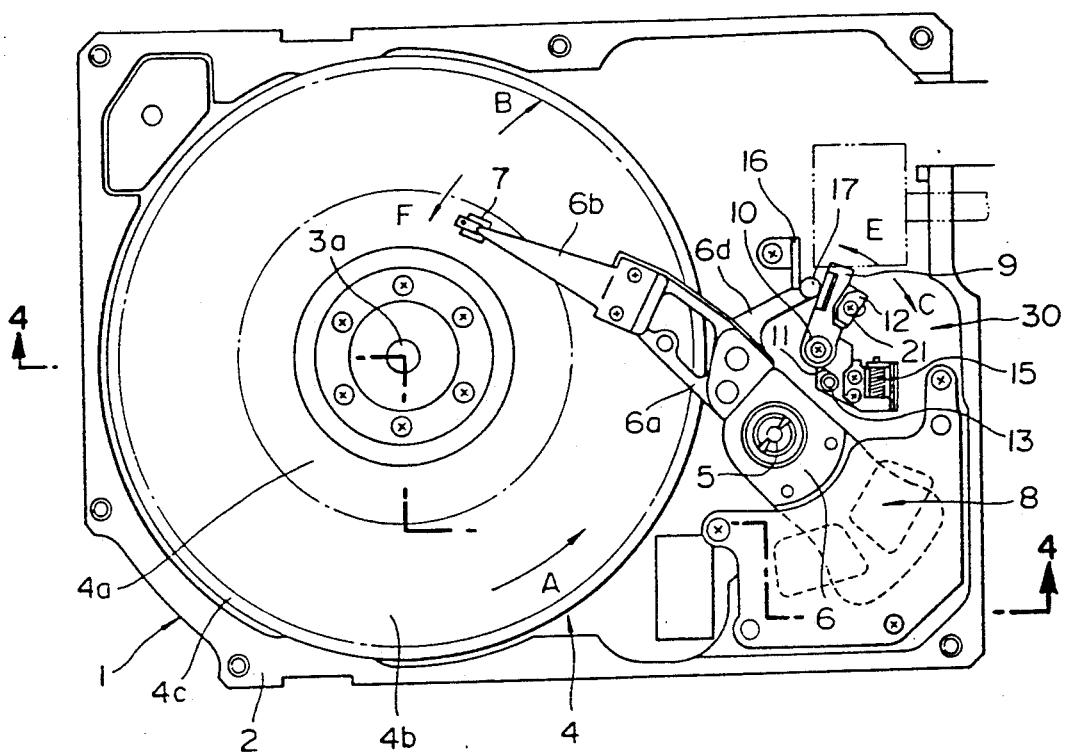
FIG. 1 is a plan view of a magnetic disk storage device according to an embodiment of the present invention with the upper part of the housing of the storage device removed: the storage device is in the landing position.

FIG. 1 depicts a magnetic disk storage device 1, with an upper part of the housing 2 removed. The bottom of the housing 2 of a rectangular box-shape is disposed in a horizontal plane. A spindle motor or a drive means 3 is provided on the bottom inner face of the housing 2. A motor shaft 3a of the spindle motor 3 extends from the spindle motor 3 upwards and perpendicular to the bottom inner face of the housing 2.

A circular magnetic disk 4 is mounted on the motor shaft 3a. The magnetic disk 4 is supported by the motor shaft 3a perpendicular to the axis of the motor shaft 3a and rotates in the direction indicated by arrow A. The magnetic disk 4 has upper and lower sides. Each of the upper and lower sides includes an inner annular non-data area 4a in which data is not written, an intermediate annular data area 4b disposed adjacent to and radially outside of the inner non-data area 4a, and an outer annular non-data area 4c disposed adjacent to and radially outside of the data area 4b. The data area 4b and inner and outer non-data areas 4a and 4c are formed coaxial to the magnetic disk 4. The width of the outer non-data area 4c is small, about the size of some 10 to 100 tracks of the magnetic disk 4 from the data area 4b.

A transfer means for moving magnetic heads 7, which will be described later, is disposed in the housing 2 of the magnetic disk storage device 1. The transfer means includes a carrier or carrying arm 6 for holding the magnetic heads 7, and a voice coil motor (positioning means) 8 for moving the carrier arm 6 so as to position the magnetic heads 7.

Figure 5:
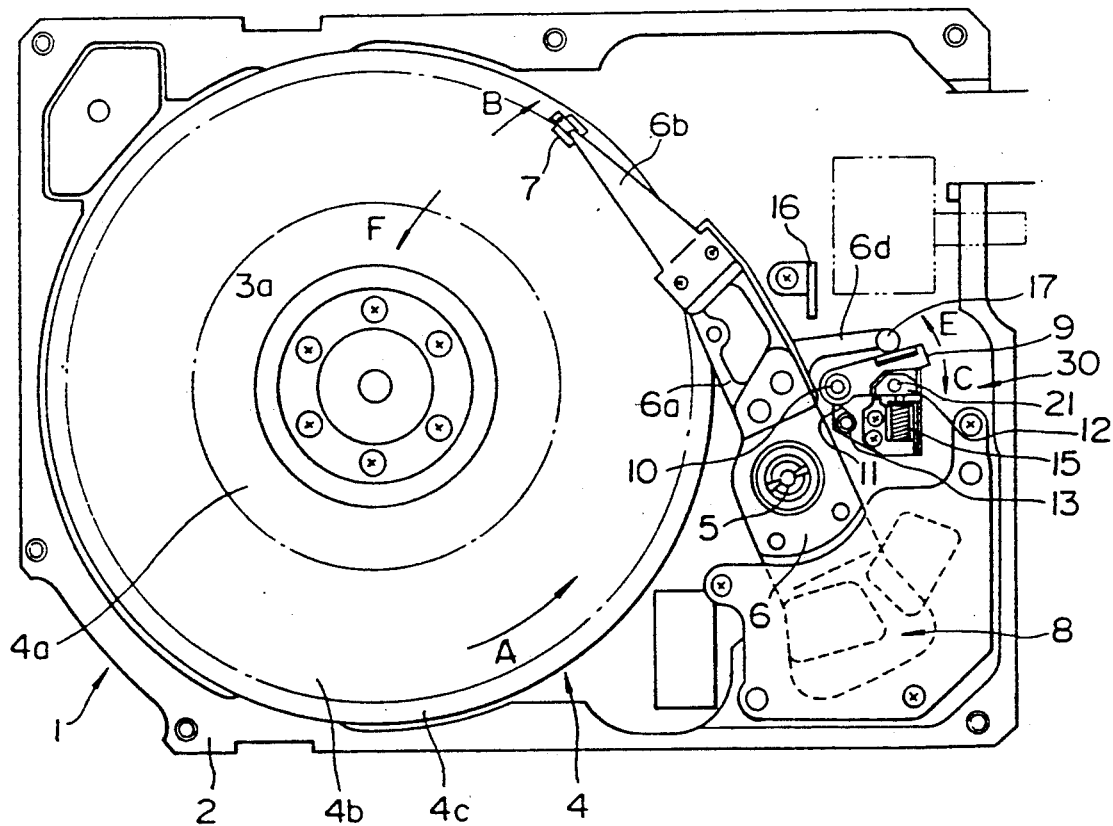
FIG. 5 is a plan view of the storage in FIG. 1 with the upper part of the housing of the storage removed: the storage is in an operational position.

A pivot shaft 5 is disposed outside the magnetic disk 4 and parallel to the motor shaft 3a of the spindle motor 3, and supports the carrier arm 6 so as to be pivotable about the pivot 5. In FIG. 5, the pivot 5 is disposed at a location lower than the spindle motor 3 and to the right of the magnetic disk 4.

Figure 4:
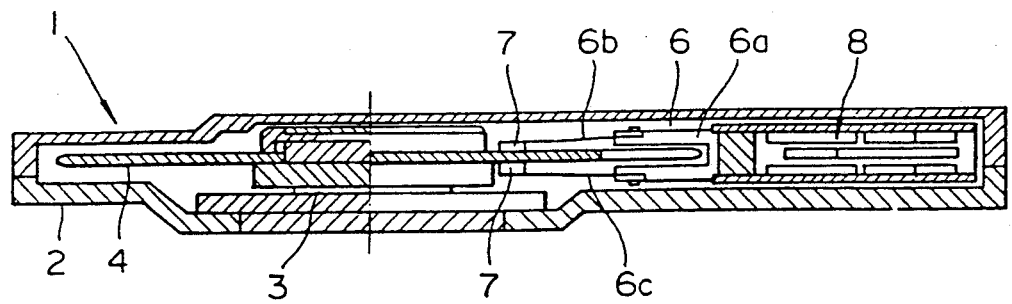
FIG. 4 is a cross sectional view of the storage device showing along line 4—4 in FIG. 1.

The carrier arm 6 comprises a proximal member 6a, a pair of distal members (extending and retracting members) 6b and 6c, and a side-protruding member 6d. The proximal member 6a of the carrier arm 6 is connected to the pivot 5, so that the carrier arm 6 is pivotable about the pivot 5. As best shown in FIG. 4, the proximal member 6a extends towards the magnetic disk 4 and branches to extend above and beneath the magnetic disk 4 in parallel relation to the disk 4. Each of the extending and retracting members 6b and 6c has proximal and distal ends, respectively. The proximal ends of the extending and retracting members 6b and 6c are disposed at the upper and lower branched ends of the proximal member 6a, respectively. The extending and retracting members 6b and 6c extend above and beneath the magnetic disk 4 in planes generally parallel to the disk 4. The extending and retracting members 6b and 6c are made of a thin plate of spring steel.

A magnetic head 7 is mounted on each of the distal ends of the upper and lower extending and retracting members 6b and 6c. The pair of magnetic heads 7 therefore oppose the upper and lower sides of the magnetic disk 4, respectively. The magnetic heads 7 are disposed in a line perpendicular to the magnetic disk 4. The rotation of the magnetic disk 4 causes air to flow over and beneath the magnetic disk 4. The heads 7 with the extending and retracting members 6b and 6c move away from the magnetic disk 4 in opposite directions perpendicular to the magnetic disk 4 due to the air flow over and beneath the magnetic disk 4 since the extending and retracting members 6b and 6c are made of a thin plate of spring steel. The heads 7 are disposed higher than and to the right of the spindle motor 3 as shown in FIG. 1. The magnetic heads 7 read and write data to and from the data area 4b of the magnetic disk 4.

As best shown in FIG. 1, the above-mentioned voice coil motor 8 is provided in the magnetic disk storage device 1 in such a manner that the stator of the motor 8 are mounted to the housing 2 and the extending and retracting member of the motor 8 is mounted on the proximal member 6a of the carrier arm 6 so as to be moved by the stator. The carrier arm 6 is driven by the voice coil motor 8 to revolve about the pivot 5. Consequently, the heads 7 can travel along a line which is generally coincidental with a radius of the magnetic disk 4.

The above-mentioned side-protruding member 6d is mounted on a side face of the proximal member 6a of the carrier arm 6, and extends from the side face farthest away from the magnetic disk 4 (rightwards in FIG. 1).

An auto-return mechanism 30 is provided on the bottom inner face of the housing 2, so as to accompany the side-protruding member 6d of the carrier arm 6. The auto-return mechanism 30 comprises an urging means for forcing the magnetic heads 7 in a direction generally along the travel path so as to move the magnetic heads 7 from the data area 4b to a landing position in the inner non-data area 4a. The auto-return mechanism 30 further comprises a locking means for preventing the urging means from jarring the magnetic heads 7 while the transfer means is actuated.

The urging means includes a reverter lever 9 and a reverter spiral spring 11.

The reverter lever 9 includes a proximal end and a free end. The proximal end is pivotally disposed on and perpendicular to the bottom inner face of the housing 2 by a pivotable pin 10 which is parallel to the axis of the motor shaft 3a of the spindle motor 3. The pivotable pin 10 is disposed lower than and right of the side-protruding member 6d in FIG. 1. The reverter lever 9 is disposed right of the side-protruding member 6d and in a plane in which the side-protruding member 6d of the carrier arm 6 is able to move, so that the free end of the reverter lever 9 is able to urge the side-protruding member 6d of the carrier arm 6 counterclockwise in order to move the magnetic heads 7 counterclockwise from the data areas 4b to non-data areas 4a.

On the right side of the reverter lever 9, a shaft 21 is connected in such a manner that the axis thereof is disposed parallel to the axis of the pivotable pin 10. An iron tip 12 of a half-circular bar shape is disposed to the shaft 21 rotatably in order to be pulled by an electromagnet 15 which will be described later. As shown in FIGS. 1 and 5 pivotable pin 10 is located between pivot 5 and the point of contact between the cushion member 17 and reverter lever 9 and approximate an imaginary line that extends between the cushion 17 and the pivot 5.

A pin 13 is disposed on and perpendicular to the inner bottom face of the housing 2, and disposed lower than and right of the proximal end of the reverter lever 9 in FIG. 1. The reverter spiral spring 11 is connected between the proximal end of the reverter lever 9 and the pin 13, so as to urge the reverter lever 9 counterclockwise as indicated by the arrow E in FIG. 1. Thus, the reverter lever 9 urges the carrier arm 6 through the side-protruding member 6d counterclockwise.

The locking means or electromagnet 15 is fixed on the inner bottom face of the housing 2 in order to activate the iron tip 12 connected to the reverter lever 9. The core of the electromagnet 15 is aligned at a location clockwise from the iron tip 12. Therefore, the electromagnet 15 pulls the iron tip 12 clockwise, overcoming the spring force of the reverter spring 11 when electric current is flown through the electromagnet 15 and when the iron tip 12 comes into contact with the electromagnet 15.

A stopper 16 is fixed on the inner bottom face of the housing 2 at a counterclockwise location of the side-protruding member 6d in order to restrict the counterclockwise movement of the carrier arm 6.

As described above, the urging means of the auto-return mechanism 30 moves and maintains the magnetic heads 7 so as to oppose the inner non-data area 4a of the magnetic disk 4 when the electric power of the magnetic disk storage device 1 is off.

Figures 2, 3:
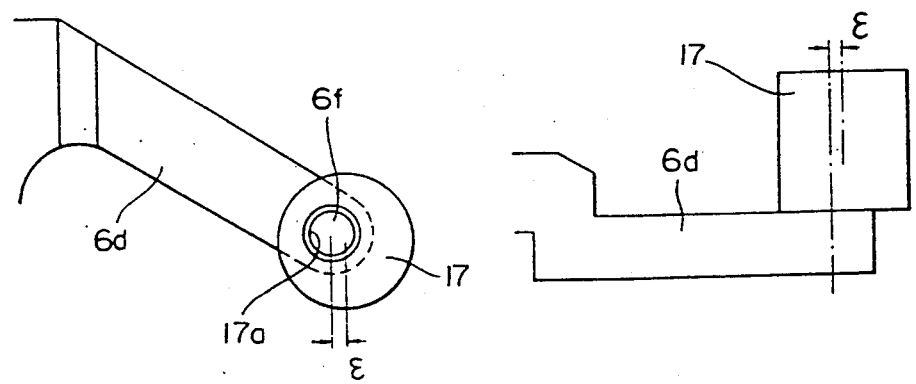
FIG. 2 is an overhead view of a cushion member of the storage device shown in FIG. 1.
FIG. 3 is a side view of the cushion member shown in FIG. 2.

As shown in FIGS. 2 and 3, at the distal end of the side-protruding member 6d of the carrier 6, a pin 6f of a circular cross section is disposed in such a manner that the axis thereof is parallel to the pivot 5. A bar-like cushion member or an adjusting means 17 of a circular cross section is disposed at the pin 6f in an eccentric relation. The cushion member 17 is made of a resilient material such as silicone rubber. The cushion member 17 has a through-hole 17a having an axis parallel to the axis of the cushion member 17. The through-hole 17a is not concentric to the cushion member 17. The through-hole 17a is slightly smaller than the pin 6f in diameter. The pin 6f is inserted into and tightly held by the through-hole 17a.

The outer peripheral face of the cushion member (adjusting means) 17 protrudes from the distal end of the side-protruding member 6d. In rotation of the cushion member 17, the protruding length of the cushion member 17 changes in a range within the eccentric displacement value $\epsilon$. Consequently, the distance between the carrier arm 6 and the reverter lever 9, when they in contact, is adjustable, so that the position of the heads 7 are able to be adjusted.

The operation of the magnetic disk storage device will be described hereinafter.

In FIG. 1, the electric power for the magnetic disk storage device 1 is off, and the magnetic storage device 1 is in the landed position. The heads 7 are disposed to oppose the landing position (inner stopped position) on the inner non-data areas 4a of the magnetic disk 4. The cushion member 17 contacts with the stopper 16.

If the electric power is turned on, the electric current for the electromagnet 15 is also tuned on; the electromagnet 15 is excited; and the voice coil motor 8 is activated. The magnetic disk 4 begins to rotate as indicated by the arrow A by means of the rotation of the spindle motor 3. The voice coil motor 8 moves the carrier arm 6 gently as indicated by the arrow B. At that time, the heads 7 move from the initial position at the inner non-data areas 4a to the data areas 4b. As a result, the reverter lever 9 is urged by the side-protruding member 6d of the carrier arm 6 and moves clockwise as indicated by the arrow C opposed by the spring force of the reverter spring 11.

As shown in FIG. 5, the magnetic heads 7 are further moved to outer stopped positions on the outer non-data areas 4c past the radially outer periphery of the data areas 4b. Each of the outer stopped positions is slightly outward track No. 0 at a distance about the size of some 10 to 100 tracks of the magnetic disk 4 from the data area 4b. Track No. 0 is the outermost track of the data area 4b, and is the starting position from where the heads 7 start to input and output. At this time, the reverter lever 9 with the iron tip 12 urged by the carrier arm 6 comes into contact with the electromagnet 15. Then, the iron tip 12 rotates about the shaft 21 so that the planar peripheral face of the half-circular shaped iron tip 12 comes into contact with the electromagnet 15. After the contact, the reverter lever 9 is electromagnetically held by the electromagnet 15.

As a result, the carrier arm 6 can move independently from the auto-return mechanism 30, so as not to be affected by the spring force of the spring 11 which may vary. Then, the heads 7 are started to move radially inward from the outer stopped position on the outer non-data areas 4c in order to read and write to and from the data areas 4b.

After the reading and/or writing of data to and from the magnetic disk 4 is finished, the electric power is turned off. In the meantime, the electromagnet 15 is also turned off and the voice coil motor 8 is deactivated.

Accordingly, the electromagnet 15 releases the reverter lever 9. As a result, the reverter lever 9 acts on the carrier arm 6 through the side protruding member 6d moving it in the counterclockwise direction as indicated by the arrow F. Since the electromagnet 15, which pulls the reverter lever 9 clockwise, is not activated, the reverter lever 9 moves counterclockwise as indicated by the arrow E without any obstacle.

The reverter spring 11 acts on the reverter lever 9 pulling in the counterclockwise direction as indicated by the arrow E. The reverter lever 9 rapidly impacts against the cushion member 17 connected to the side protruding member 6d of the carrier arm 6. Therefore, the heads 7 mounted on the extending and retracting members 6b and 6c are moved counterclockwise from the data areas 4b to the landing positions on the inner non-data areas 4a. Then, the side-protruding member 6d impacts on the stopper 16, so that the movement of the heads 7 is stopped. In the reverting motion of the heads 7, the magnetic disk 4 is still rotating so that the heads 7 are spaced apart from the magnetic disk 4 in a orientation perpendicular to the magnetic disk 4.

Then, the rotation of the magnetic disk 4 is completely stopped while the heads 7 are maintained in a position over the non-data areas 4a.

With such a structure, when the magnetic disk 4 is not rotating, the magnetic heads 7 are maintained at the non-data area 4a of the magnetic disk 4. Specifically, after the electric power for rotation of the magnetic disk 4 is turned off, the magnetic heads 7 are moved from the data area 4b to the non-data area 4a immediately by the auto-return mechanism 30 while the magnetic disk 4 is still sufficiently rotating to make the air flow which keeps the heads apart from the magnetic disk 4. After the magnetic disk 4 is begins to rotate, the voice coil motor 8 moves the carrier arm 6 to move the magnetic heads 7 from the non-data areas 4a to the data areas 4b. Consequently, the data areas 4b of the magnetic disk 4 are protected from contact of the magnetic heads 7. Therefore, data loss is eliminated.

In addition, if the electric power provided to the magnetic disk storage device 1 fails, the auto-return mechanism 30 reverts the heads 7 into the landing position on the inner non-data area 4a. Data loss because of power failure, is thus eliminated.

In addition, since the magnetic heads 7 are maintained at the non-data areas 4a, data loss caused by movement of the magnetic disk storage device 1 is eliminated.

Furthermore, when the heads 7 are moved to the outer stopped positions so as to oppose the outer non-data areas 4c, the electromagnet 15 locks the reverter lever 9. Accordingly, the reverter lever 9 is spaced apart and thus prevented from jarring the magnetic heads 7. The carrier arm 6 is able to move independent from the auto-return mechanism 30. The voice coil motor 8 controls the movement and position of the heads 7 accurately and smoothly.

Furthermore, since the cushion member 17 is disposed between the carrier arm 6 and the reverter lever 9, the impact of the carrier arm 6 and the reverter lever 9 is reduced. Although the carrier arm 6 moves freely when the voice coil motor 8 loses control, the impact is reduced.

Since the cushion member 17 is eccentrically mounted on the pin 6f, the distance between the carrier arm 6 and the reverter lever 9 is able to be adjusted by rotation of the cushion member 17. Accordingly, the outer stopped position at which the cushion member 17 comes into contact with the reverter lever 9 can be adjusted, so that the heads 7 can adequately start to read and write information signals from the track No. 0. If the carrier arm 6 has a large dimension error due to manufacturing and assembling of the carrier, the adjusting is advantageous.

The above-mentioned magnetic disk storage device is especially preferable for in a case that the diameter of the magnetic disk 7 is equal or less than 96 mm. In this case, the magnetic disk storage device is usually portable. The magnetic heads 7 are maintained at the non-data areas 4a in order to eliminate data loss although the magnetic disk storage device is undesirably shaken.

What is claimed is:

1. A magnetic disk storage device comprising:
   at least one magnetic disk disposed for rotation about an axis through the center thereof and having an annular data area for recording information signals and an annular non-data area;
   drive means for rotating the magnetic disk about said axis;
   a magnetic head for reading and writing data to and from the data area of the magnetic disk, the magnetic head being disposed for movement along a travel path generally coincidental with a radius of the magnetic disk;
   transfer means for moving the magnetic head along the travel path when said transfer means is actuated;
   parking means for forcing the magnetic head in a direction along the travel path so as to move the magnetic head into the non-data area;
   said transfer means comprising a carrying arm for carrying the magnetic head, the carrying arm being disposed in a plane parallel to the magnetic disk for pivoting about an axis, and positioning means for pivoting the carrying arm about said carrying arm axis, the magnetic head being mounted on the carrying arm and moving therewith,
   the parking means comprising lever means for engaging said carrying arm, the lever means being rotatably disposed, and spring means for acting on the lever means so as to urge the lever means to the carrying arm, a pivot point for rotation of said lever means being located between the pivot axis for motion of said carrying arm and a contact point between said lever means and said carrying arm.

2. A magnetic disk storage device according to claim 1, wherein the lever means of the parking means includes at least a portion made of a magnetic substance, and further comprising locking means for preventing the parking means from jarring the magnetic head when the disk storage device is operative, the locking means including an electromagnet, said electromagnet magnetically holding the lever means when the positioning means is actuated, whereby preventing the parking means from jarring the magnetic head.

3. A magnetic disk storage device according to claim 1, wherein the parking means impacts against the carrying arm so as to force the magnetic head into said non-data area, one of the carrying means and the parking means having cushion means for contacting the other of the carrying means and parking means, the cushion means being made of a resilient material so as to reduce the impact of the parking means with the carrying means.

4. A magnetic disk storage device comprising:
   at least one magnetic disk disposed for rotation about an axis through the center thereof and having an annular data area for recording information signals and an annular non-data area;
   drive means for rotating the magnetic disk about said axis;
   a magnetic head for reading and writing data to and from the data area of the magnetic disk, the magnetic head being disposed for movement along a travel path generally coincidental with a radius of the magnetic disk;
   transfer means for moving the magnetic head along the travel path when said transfer means is actuated;
   parking means for forcing the magnetic head in a direction along the travel path so as to move the magnetic head into the non-data area;
   a locking means for preventing the parking means from jarring the magnetic head when the transfer means is actuated;
   wherein the transfer means comprises a carrying arm for carrying the magnetic head and a positioning means for positioning the carrying arm, the carrying arm being disposed in a plane parallel to the magnetic disk for pivoting about the axis, the positioning means pivoting the carrying arm about said carrying arm axis, the magnetic head being mounted on the carrying arm so that the positioning means positions the magnetic head, the parking means impacts against the carrying arm so as to force the magnetic head into said non-data area, one of the carrying arm and the parking means having cushion means for contacting the other of the carrying arm and the parking means, the cushion means being a resilient material so as to reduce the impact of the parking means with the carrying arm,
   the data area of the magnetic disk including a starting position at a peripheral portion thereof, the carrying arm of the transfer means thrusting on the parking means through the cushioning means when the magnetic head moves from said non-data position to the starting position, the locking means locking the parking means in position when the magnetic head is positioned at the starting position, the cushioning means including an adjusting means for adjusting a distance between the carrying arm and the parking means when said magnetic head is in said non-data position, whereby the starting position of the magnetic head is adjustable.

5. A magnetic disk storage device according to claim 4, the magnetic disk storage device is a portable type.

6. A magnetic disk storage device according to claim 5, wherein a diameter of the magnetic disk is equal to or less than 96 mm.

7. A magnetic disk storage device including a rotatably mounted magnetic disk storage device including a rotatably mounted magnetic storage disk, said disk being divided into at least a data area and a non-data area, drive means for rotating said disk, a carrier arm holding a magnetic head and mounted for motion that moves said head along a travel path relative to said disk, motor means for transferring said carrier arm to thereby move said head between said non-data and data areas, comprising:

parking means biased for forcing the magnetic head along the travel path into a position where the magnetic head is in the non-data area;

locking means for holding the parking means in position for preventing the parking means from forcing the magnetic head when said storage device is operative and said magnetic head is in said data area, and for releasing said parking means when said storage device in inoperative, said parking means forcing said magnetic head to said non-data area;

cushion means on one of said carrier arm and parking means for force transmission, said cushion means being positioned between said carrier arm and said parking means leaving a gap between said carrier arm and said parking means when said parking means forces said head along said travel path to said non-data area and when said motor means moves said head along said travel path from said non-data area to said data area, said cushion means including adjusting means for adjusting said gap between said carrier arm and said parking means, whereby a starting position of said magnetic head relative to said data area may be adjusted.

* * * * *